(12) United States Patent
Lin

(10) Patent No.: US 10,214,263 B2
(45) Date of Patent: Feb. 26, 2019

(54) ANGLE ADJUSTABLE QUICK RELEASE

(71) Applicant: Chang Hui Lin, Changhu (TW)

(72) Inventor: Chang Hui Lin, Changhu (TW)

( * ) Notice: Subject to any disclaimer, the term of this patent is extended or adjusted under 35 U.S.C. 154(b) by 373 days.

(21) Appl. No.: 15/233,777

(22) Filed: Aug. 10, 2016

(65) Prior Publication Data

US 2018/0045233 A1 Feb. 15, 2018

(51) Int. Cl.
B62K 25/02 (2006.01)

(52) U.S. Cl.
CPC .......... B62K 25/02 (2013.01); *B62K 2206/00* (2013.01)

(58) Field of Classification Search
CPC .. B62K 25/02; B62K 2206/00; B60B 27/026; B60B 27/023; Y10T 403/595; Y10T 403/7071
USPC .................... 403/DIG. 4; 301/124.2
See application file for complete search history.

(56) References Cited

U.S. PATENT DOCUMENTS

| | | | | |
|---|---|---|---|---|
| 4,598,614 A * | 7/1986 | Kipp | ........................ | G05G 1/12 81/58.3 |
| 4,679,862 A * | 7/1987 | Luo | ........................ | A61G 5/10 301/112 |
| 5,371,919 A * | 12/1994 | Winkler | ..................... | F16D 1/12 16/422 |
| 5,533,232 A * | 7/1996 | Boyer | ........................ | B25B 5/16 16/402 |
| 5,879,100 A * | 3/1999 | Winkler | ..................... | F16D 1/12 16/422 |
| 7,055,220 B2 * | 6/2006 | Bertani | ..................... | B25G 1/10 16/436 |
| 8,075,065 B2 * | 12/2011 | Mercat | ..................... | B62K 25/02 301/110.5 |
| 8,113,529 B2 * | 2/2012 | Spahr | ..................... | B62K 25/02 280/276 |
| 9,259,966 B2 * | 2/2016 | Lin | ........................ | B60B 27/026 |
| 9,463,842 B2 * | 10/2016 | Nakajima | ............... | B62K 25/02 |
| 9,758,209 B2 * | 9/2017 | Schlanger | ............. | B60B 27/026 |
| 9,862,452 B2 * | 1/2018 | Spahr | ..................... | B60B 27/026 |
| 9,963,190 B1 * | 5/2018 | Liu | ........................ | B62K 25/02 |
| 2009/0102276 A1 * | 4/2009 | Mercat | ..................... | B62K 25/02 301/124.2 |

(Continued)

FOREIGN PATENT DOCUMENTS

| | | | | |
|---|---|---|---|---|
| DE | 4410374 A1 * | 9/1995 | ........... | B60B 27/023 |
| EP | 3040259 A1 * | 7/2016 | ............. | B62K 25/02 |

(Continued)

*Primary Examiner* — Matthieu F Setliff

(57) ABSTRACT

An angle adjustable quick release contains: a connection post, a fixing holder, a rotatable controller, a press knob, a screw bolt, a return spring, and a screw nut. The connection post includes a hollow extension, a first locking ring, a second locking ring, a circular toothed loop, and a second C-shaped notch. The fixing holder includes a through orifice, a peripheral rib, and a third C-shaped notch. The rotatable controller includes a hollow cylinder, a second accommodation groove, a locking shoulder, a first toothed protrusion, and an operation trench. The press knob includes a driving section, a stop projection, a second toothed protrusion, and an arcuate hole. The screw bolt is housed in the first accommodation groove and is locked in the screwing aperture through the return spring and a C ring, and the C ring is locked in the first C-shaped notch.

7 Claims, 6 Drawing Sheets

(56) References Cited

U.S. PATENT DOCUMENTS

| | | | | |
|---|---|---|---|---|
| 2009/0230653 | A1* | 9/2009 | Spahr | B62K 25/02 |
| | | | | 280/276 |
| 2015/0054254 | A1* | 2/2015 | Spahr | B60B 27/026 |
| | | | | 280/278 |
| 2015/0069827 | A1* | 3/2015 | Nakajima | B62K 25/02 |
| | | | | 301/124.2 |
| 2015/0266341 | A1* | 9/2015 | Lin | B60B 27/026 |
| | | | | 301/124.2 |
| 2016/0121961 | A1* | 5/2016 | Schlanger | B60B 27/026 |
| | | | | 301/124.2 |
| 2017/0066497 | A1* | 3/2017 | Kuerner | B62K 25/02 |
| 2017/0174287 | A1* | 6/2017 | Huang | B62K 25/02 |
| 2017/0259616 | A1* | 9/2017 | Fusari | B60B 27/026 |
| 2018/0029411 | A1* | 2/2018 | Kamada | B60B 27/026 |
| 2018/0264880 | A1* | 9/2018 | Liu | B60B 27/026 |

FOREIGN PATENT DOCUMENTS

| | | | | |
|---|---|---|---|---|
| EP | 3345819 A1 * | 7/2018 | | B62K 25/02 |
| FR | 3037863 B1 * | 7/2017 | | B60B 27/026 |
| FR | 3037919 B1 * | 7/2017 | | B62K 25/02 |
| WO | WO-2008145496 A2 * | 12/2008 | | B62K 25/02 |

* cited by examiner

ANGLE ADJUSTABLE QUICK RELEASE

FIELD OF THE INVENTION

The present invention relates to an angle adjustable quick release in which a pull lever is idly rotated forward or backward so as to move to a desired angle randomly.

BACKGROUND OF THE INVENTION

When a conventional quick release retains with a front fork or a rear fork of a bicycle, a pull lever of the quick release is pushed to form a straight line with a connection post, a rotatable controller is rotated to drive the connection post to force a screw nut, and the pull lever is pushed to retain with the connection post. However, the pull lever is stopped by the front fork or the rear fork of the bicycle, thus influencing riding safety.

The present invention has arisen to mitigate and/or obviate the afore-described disadvantages.

SUMMARY OF THE INVENTION

The primary objective of the present invention is to provide an angle adjustable quick release in which a pull lever is idly rotated forward or backward so as to move to a desired angle randomly.

To obtain above-mentioned objective, an angle adjustable quick release contains: a connection post, a fixing holder, a rotatable controller, a press knob, a screw bolt, a return spring, and a screw nut.

The connection post includes a hollow extension, and the hollow extension has a first accommodation groove defined therein, a first C-shaped notch formed around a first end of the first accommodation groove, and a threaded section arranged on an external wall of a first end of the hollow extension so as to screw with the screw nut.

The fixing holder is fitted with the connection post and the rotatable controller.

The rotatable controller accommodates the press knob, the screw bolt, and the return spring.

The connection post also includes a first locking ring disposed on a second end of the hollow extension, and a diameter of the first locking ring is greater than the hollow extension, the connection post further includes a second locking ring mounted on one end of the first locking ring, and a diameter of the second locking ring is greater than the first locking ring, the connection post further includes a circular toothed loop mounted on one end of the second locking ring and includes a second C-shaped notch defined between the first locking ring and the second locking ring.

The fixing holder includes a through orifice formed on a central position thereof, a peripheral rib arranged on the through orifice, and a third C-shaped notch defined in the through orifice.

The rotatable controller includes a hollow cylinder, and the hollow cylinder has a pull lever extending outwardly from an outer rim thereof, the rotatable controller also includes a second accommodation groove defined in a central position thereof, a locking shoulder arranged on a bottom of the second accommodation groove, a first toothed protrusion formed on a middle section of the second accommodation groove, and an operation trench defined on a lower end of the first toothed protrusion.

The press knob includes a driving section arranged on a front end thereof, a stop projection extending outwardly around a middle section thereof, a second toothed protrusion formed on a bottom thereof, and an arcuate hole defined on a central position of a bottom of the second toothed protrusion, the driving section has a screwing aperture defined on a central position thereof and passing through the arcuate hole so as to form a pushing face.

The screw bolt is inserted through the return spring and a C ring so as to be housed in the first accommodation groove of the hollow extension and to be locked in the screwing aperture of the driving section, and the C ring is locked in the first C-shaped notch so that two ends of the return spring are forced by the C ring and the pushing face.

DETAILED DESCRIPTION OF THE PREFERRED EMBODIMENTS

Figure 1:
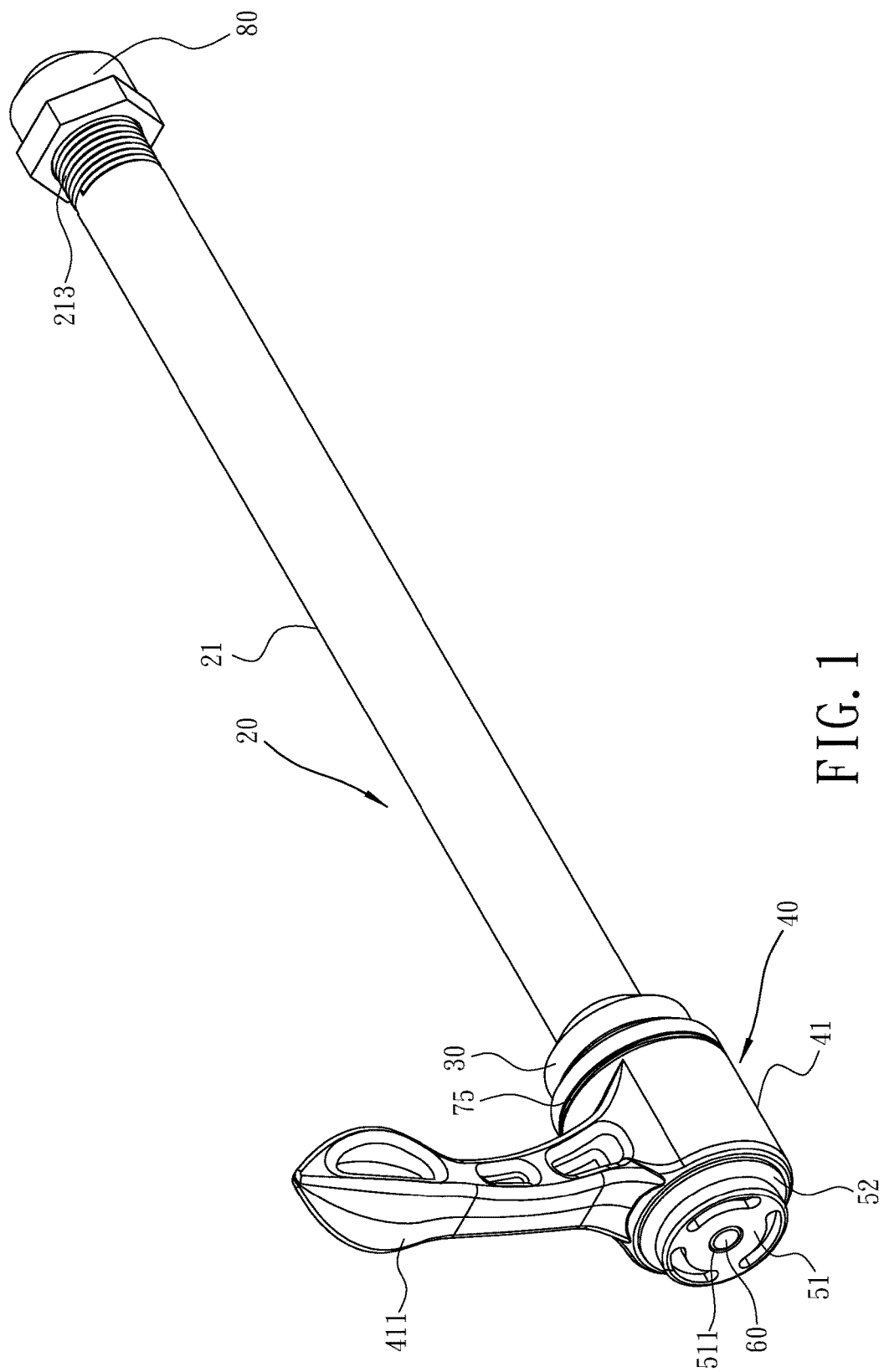
FIG. 1 is a perspective view showing the assembly of an angle adjustable quick release according to a preferred embodiment of the present invention.
Figure 2:
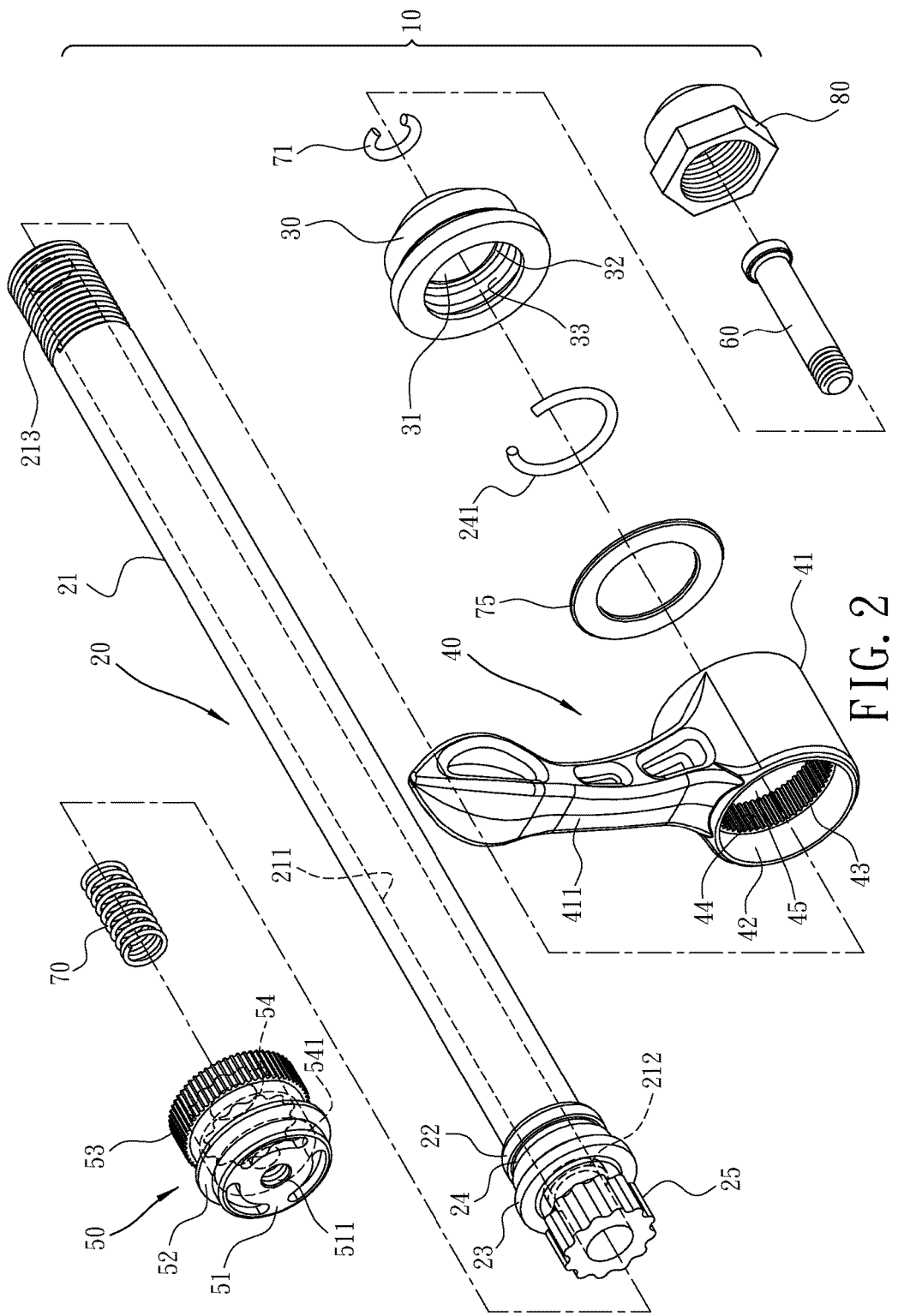
FIG. 2 is a perspective view showing the exploded components of the angle adjustable quick release according to the preferred embodiment of the present invention.

With reference to FIGS. 1 to 6, an angle adjustable quick release 10 according to a preferred embodiment of the present invention comprises: a connection post 20, a fixing holder 30, a rotatable controller 40, a press knob 50, a screw bolt 60, a return spring 70, and a screw nut 80.

The connection post 20 includes a hollow extension 21, and the hollow extension 21 has a first accommodation groove 211 defined therein, a first C-shaped notch 212 formed around a first end of the first accommodation groove 211, and a threaded section 213 arranged on an external wall of a first end of the hollow extension 21 so as to screw with the screw nut 80.

The fixing holder 30 is fitted with the connection post 20 and the rotatable controller 40.

The rotatable controller 40 accommodates the press knob 50, the screw bolt 60, and the return spring 70.

The connection post 20 also includes a first locking ring 22 disposed on a second end of the hollow extension 21, and a diameter of the first locking ring 22 is greater than the hollow extension 21. The connection post 20 further includes a second locking ring 23 mounted on one end of the first locking ring 22, and a diameter of the second locking ring 23 is greater than the first locking ring 22. The connection post 20 further includes a circular toothed loop 25 mounted on one end of the second locking ring 23 and includes a second C-shaped notch 24 defined between the first locking ring 22 and the second locking ring 23, wherein the second C-shaped notch 24 houses a C ring 241 configured to retain the fixing holder 30.

Between the rotatable controller 40 and the fixing holder 30 is defined a rubber washer 75, and the fixing holder 30 includes a through orifice 31 formed on a central position thereof, a peripheral rib 32 arranged on the through orifice 31, and a third C-shaped notch 33 defined in the through orifice 31.

The rotatable controller 40 includes a hollow cylinder 41, and the hollow cylinder 41 has a pull lever 411 extending outwardly from an outer rim thereof. The rotatable controller 40 also includes a second accommodation groove 42 defined in a central position thereof, a locking shoulder 43 arranged on a bottom of the second accommodation groove 42, a first toothed protrusion 44 formed on a middle section of the second accommodation groove 42, and an operation trench 45 defined on a lower end of the first toothed protrusion 44.

The press knob 50 includes a driving section 51 arranged on a front end thereof, a stop projection 52 extending outwardly around a middle section thereof, a second toothed protrusion 53 formed on a bottom thereof, and an arcuate hole 54 defined on a central position of a bottom of the second toothed protrusion 53. The driving section 51 has a screwing aperture 511 defined on a central position thereof and passing through the arcuate hole 54 so as to form a pushing face 541.

The screw bolt 60 is inserted through the return spring 70 and a C ring 71 so as to be housed in the first accommodation groove 211 of the hollow extension 21 and to be locked in the screwing aperture 511 of the driving section 51, and the C ring 71 is locked in the first C-shaped notch 212 so that two ends of the return spring 70 are forced by the C ring 71 and the pushing face 541.

Figure 3:
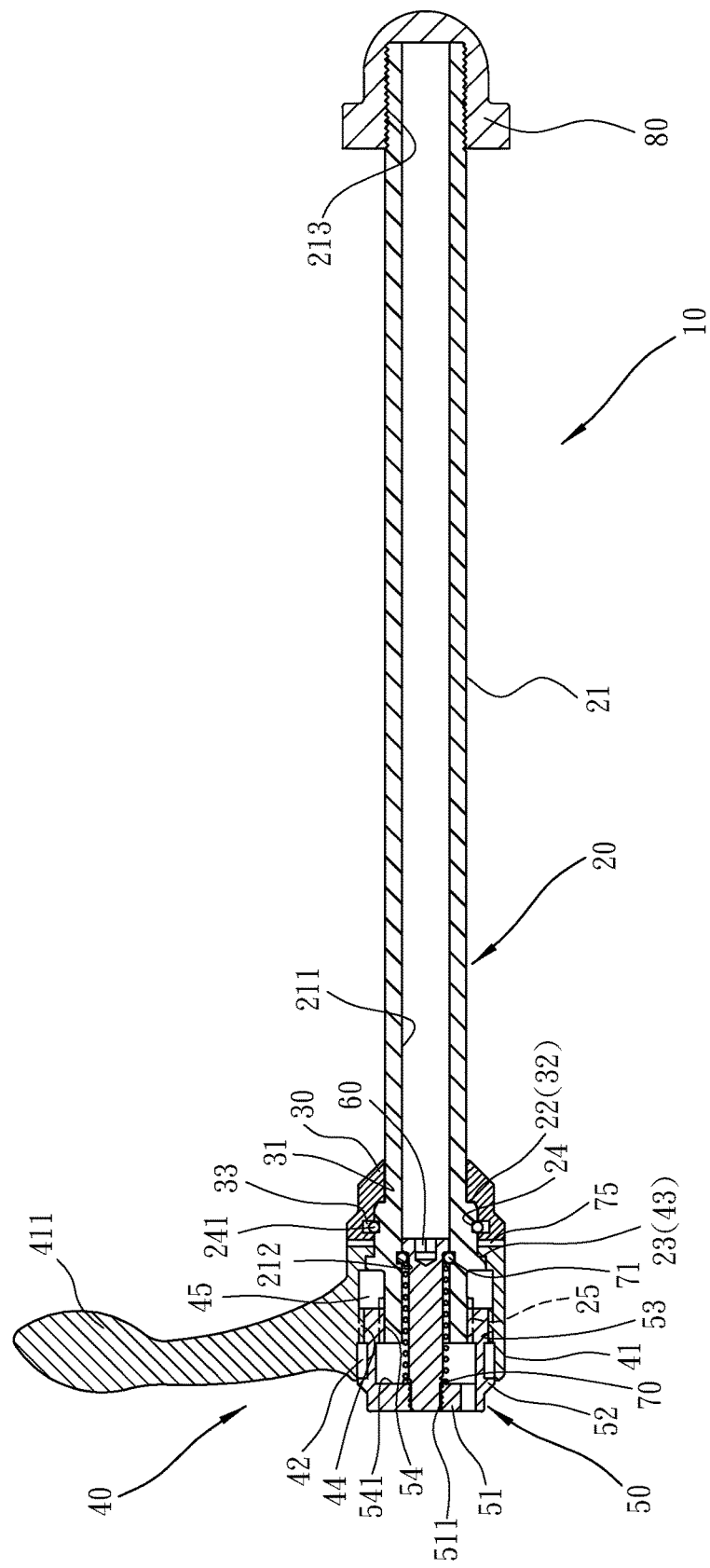
FIG. 3 is a cross sectional view showing the assembly of the angle adjustable quick release according to the preferred embodiment of the present invention.

Referring to FIG. 3, the press knob 50 is pushed by a first end of the return spring 70 so as to abut against the pushing face 541, and a second end of the return spring 70 pushes the C ring 71 so that the driving section 51 extends out of the second accommodation groove 42 of the rotatable controller 40, and the second toothed protrusion 53 of the press knob 50 retains with the first toothed protrusion 44 of the rotatable controller 40, wherein the arcuate hole 54 of the press knob 50 accommodates the circular toothed loop 25 of the connection post 20, hence the pull lever 411 is rotated in a clockwise direction or a counterclockwise direction so as to actuate the rotatable controller 40, the press knob 50, and the connection post 20 to revolve in the clockwise direction or the counterclockwise direction, and the threaded section 213 of the connection post 20 screws with or unscrews from the screw nut 80.

Figure 4:
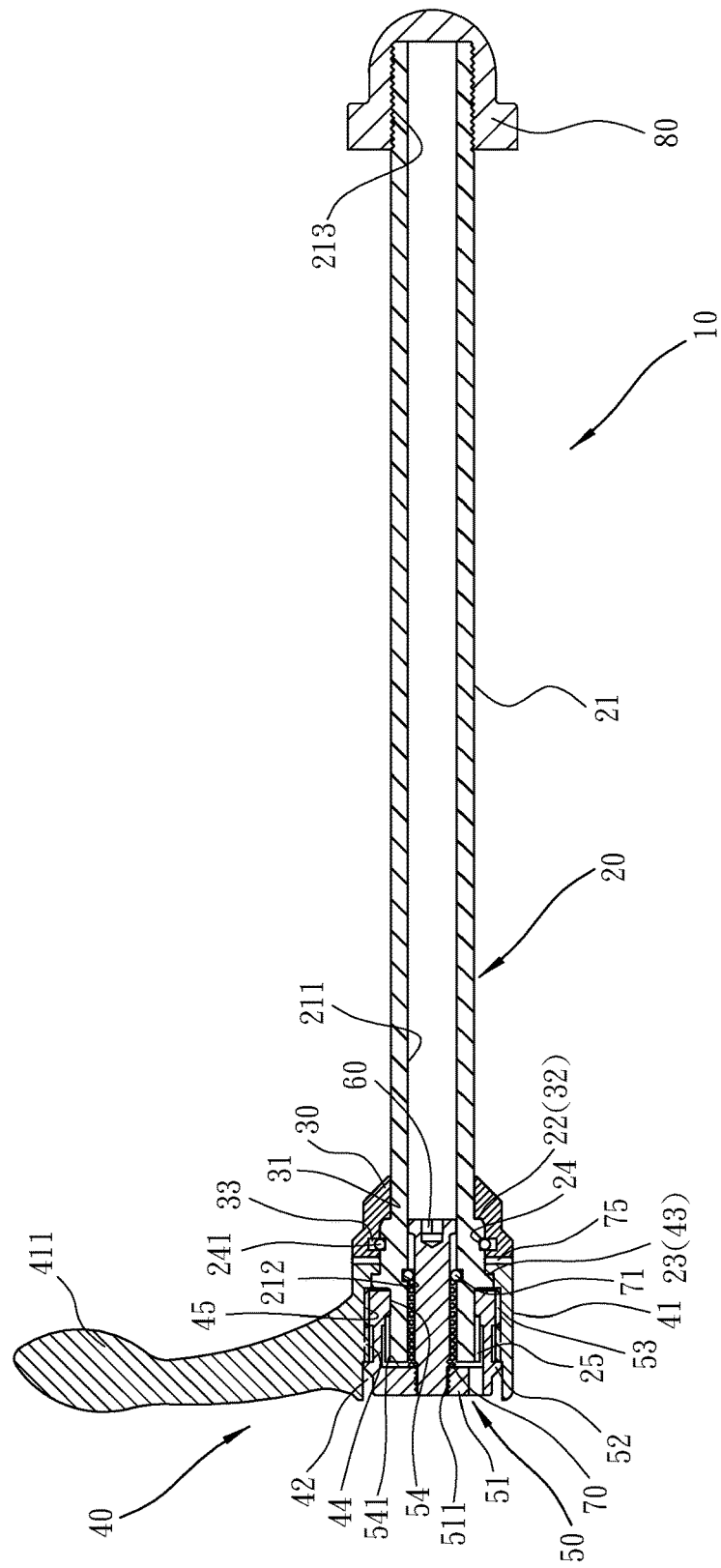
FIG. 4 is a cross sectional view showing the operation of the angle adjustable quick release according to the preferred embodiment of the present invention.
Figure 5:
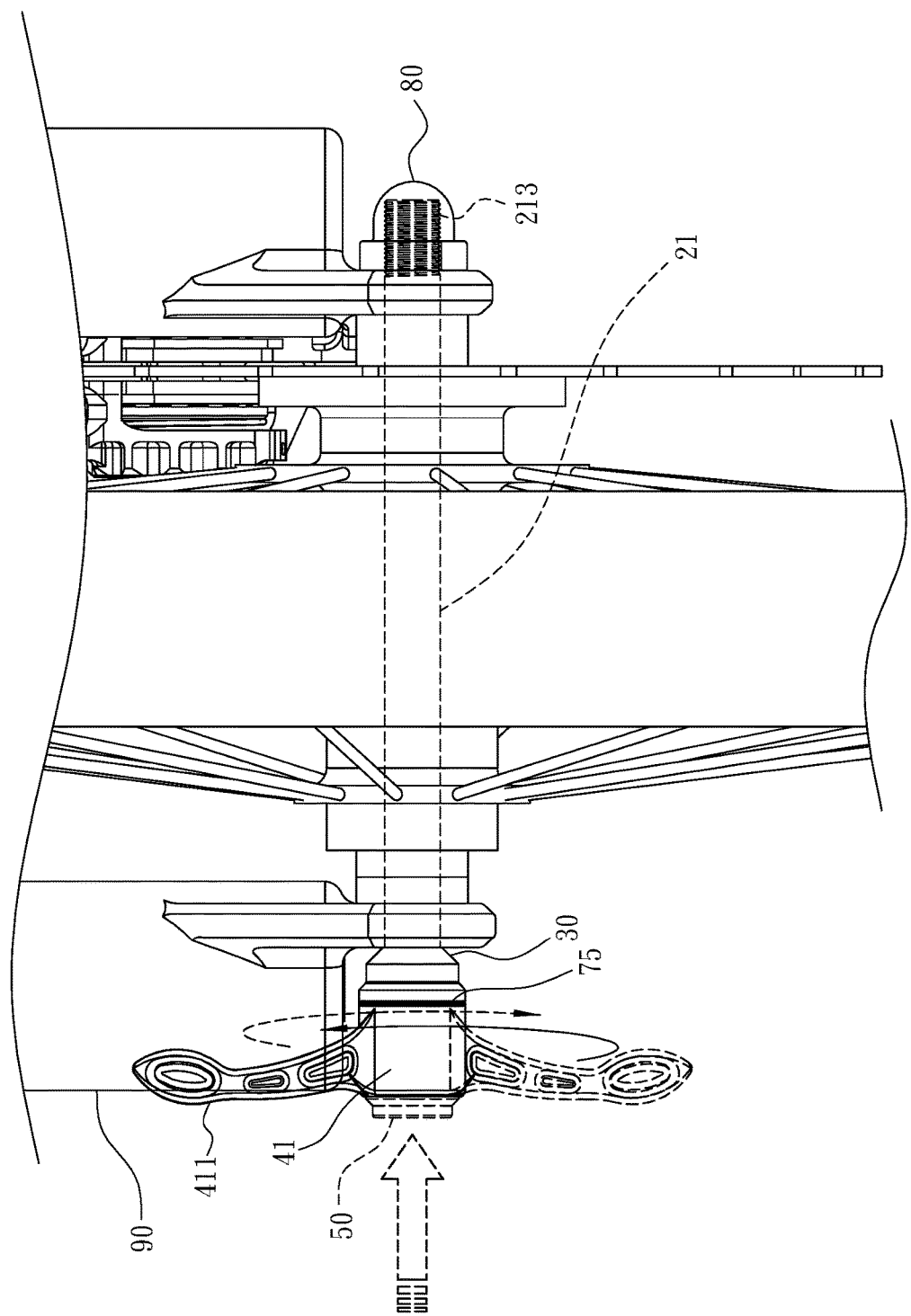
FIG. 5 is a side plane view showing the operation of the angle adjustable quick release according to the preferred embodiment of the present invention.

When the hollow cylinder 41 of the angle adjustable quick release 10 is stopped by a front fork 90 in a locking process, as shown in FIGS. 4 and 5, the press knob 50 is pressed to contact with an upper end of the first toothed protrusion 44 so that the second toothed protrusion 53 moves into the operation trench 45 and removes from the first toothed protrusion 44 of the rotatable controller 40. In the meantime, the pull lever 411 is rotated in the counterclockwise direction so as to drive the rotatable controller 40 to rearward rotate idly and does not actuate the press knob 50 and the connection post 20 to move in the counterclockwise direction. Thereafter, the press knob 50 is released so that the return spring 70 pushes the press knob 50 back to an original position, and the second toothed protrusion 53 of the press knob 50 retains with the first toothed protrusion 44 of the rotatable controller 40, the arcuate hole 54 of the press knob 50 accommodates the circular toothed loop 25 of the connection post 20, hence the pull lever 411 is rotated in the clockwise direction so as to actuate the rotatable controller 40, the press knob 50, and the connection post 20 to revolve in the clockwise direction so that the threaded section 213 of the connection post 20 screws with the screw nut 80, thereafter the press knob 50 is pressed to rotate idly and repeatedly until the connection post 20 forces the screw nut 80 completely.

Figure 6:
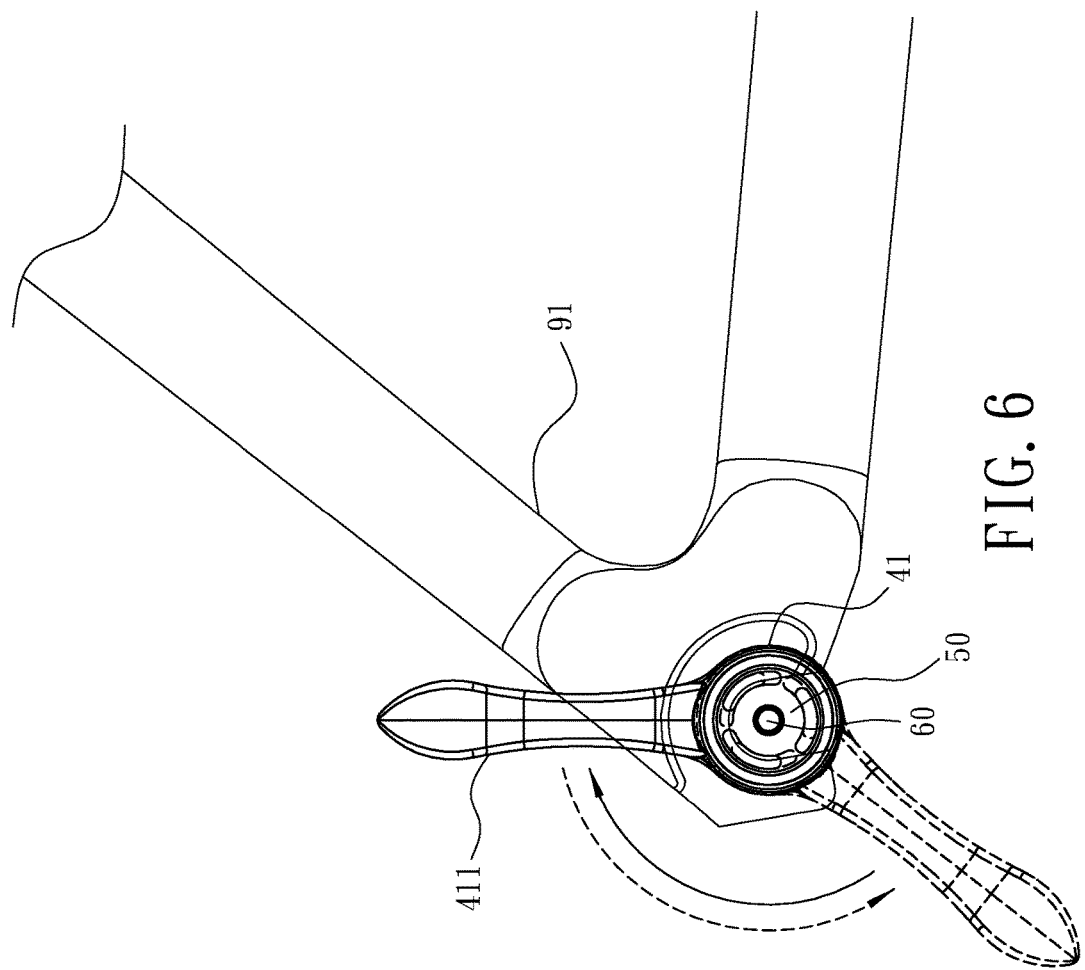
FIG. 6 is another side plane view showing the operation of the angle adjustable quick release according to the preferred embodiment of the present invention.

When the hollow cylinder 41 of the angle adjustable quick release 10 is stopped by a rear fork 91 in the locking process, as shown in FIGS. 4 and 6, the press knob 50 is pressed to contact with the upper end of the first toothed protrusion 44 so that the second toothed protrusion 53 moves into the operation trench 45 and removes from the first toothed protrusion 44 of the rotatable controller 40. In the meantime, the pull lever 411 is rotated in the counterclockwise direction so as to drive the rotatable controller 40 to rearward rotate idly and does not actuate the press knob 50 and the connection post 20 to move in the counterclockwise direction. Thereafter, the press knob 50 is released so that the return spring 70 pushes the press knob 50 back to the original position, and the second toothed protrusion 53 of the press knob 50 retains with the first toothed protrusion 44 of the rotatable controller 40, the arcuate hole 54 of the press knob 50 accommodates the circular toothed loop 25 of the connection post 20, hence the pull lever 411 is rotated in the clockwise direction so as to actuate the rotatable controller 40, the press knob 50, and the connection post 20 to revolve in the clockwise direction so that the threaded section 213 of the connection post 20 screws with the screw nut 80, thereafter the press knob 50 is pressed to rotate idly and repeatedly until the connection post 20 forces the screw nut 80 completely.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. An angle adjustable quick release comprising: a connection post, a fixing holder, a rotatable controller, a press knob, a screw bolt, a return spring, and a screw nut;
   the connection post including a hollow extension, and the hollow extension having a first accommodation groove defined therein, a first C-shaped notch formed around a first end of the first accommodation groove, and a threaded section arranged on an external wall of a first end of the hollow extension so as to screw with the screw nut;
   the fixing holder being fitted with the connection post and the rotatable controller;
   the rotatable controller accommodating the press knob, the screw bolt, and the return spring;
   the connection post also including a first locking ring disposed on a second end of the hollow extension, and a diameter of the first locking ring being greater than the hollow extension, the connection post further including a second locking ring mounted on one end of the first locking ring, and a diameter of the second locking ring being greater than the first locking ring, the connection post further including a circular toothed loop mounted on one end of the second locking ring and including a second C-shaped notch defined between the first locking ring and the second locking ring;
   the fixing holder including a through orifice formed on a central position thereof, a peripheral rib arranged on the through orifice, and a third C-shaped notch defined in the through orifice;

the rotatable controller including a hollow cylinder, and the hollow cylinder having a pull lever extending outwardly from an outer rim thereof, the rotatable controller also including a second accommodation groove defined in a central position thereof, a locking shoulder arranged on a bottom of the second accommodation groove, a first toothed protrusion formed on a middle section of the second accommodation groove, and an operation trench defined on a lower end of the first toothed protrusion;

the press knob including a driving section arranged on a front end thereof, a stop projection extending outwardly around a middle section thereof, a second toothed protrusion formed on a bottom thereof, and an arcuate hole defined on a central position of a bottom of the second toothed protrusion, the driving section having a screwing aperture defined on a central position thereof and passing through the arcuate hole so as to form a pushing face; and the screw bolt being inserted through the return spring and a C ring so as to be housed in the first accommodation groove of the hollow extension and to be locked in the screwing aperture of the driving section, and the C ring being locked in the first C-shaped notch so that two ends of the return spring are forced by the C ring and the pushing face.

2. The angle adjustable quick release as claimed in claim 1, wherein the second C-shaped notch houses a C ring configured to retain the fixing holder.

3. The angle adjustable quick release as claimed in claim 1, wherein between the rotatable controller and the fixing holder is defined a rubber washer.

4. The angle adjustable quick release as claimed in claim 1, wherein when the second toothed protrusion of the press knob retains with the first toothed protrusion of the rotatable controller, the arcuate hole of the press knob accommodates the circular toothed loop of the connection post, hence the pull lever is rotated in a clockwise direction or a counterclockwise direction so as to actuate the rotatable controller, the press knob, and the connection post to revolve in the clockwise direction or the counterclockwise direction.

5. The angle adjustable quick release as claimed in claim 1, wherein the press knob is pushed by a first end of the return spring so as to abut against the pushing face, and a second end of the return spring pushes the C ring so that the driving section extends out of the second accommodation groove of the rotatable controller.

6. The angle adjustable quick release as claimed in claim 1, wherein the return spring pushes the press knob back to an original position.

7. The angle adjustable quick release as claimed in claim 1, wherein the press knob is pressed to contact with an upper end of the first toothed protrusion so that the second toothed protrusion moves into the operation trench and removes from the first toothed protrusion of the rotatable controller.

* * * * *